United States Patent [19]
Sato

[11] Patent Number: 5,177,619
[45] Date of Patent: Jan. 5, 1993

[54] APPARATUS FOR MINIMIZING SIGNAL DEGRADATION DURING THE COPYING OF VIDEO SIGNALS FROM ONE RECORDING MEDIUM TO ANOTHER RECORDING MEDIUM

[75] Inventor: Kouichi Sato, Fujimi, Japan

[73] Assignee: Asahi Kogaku Kogyo Kabushiki Kaisha, Tokyo, Japan

[21] Appl. No.: 875,547

[22] Filed: Apr. 27, 1992

Related U.S. Application Data

[63] Continuation of Ser. No. 782,726, Oct. 28, 1991, abandoned, which is a continuation of Ser. No. 238,420, Aug. 31, 1988, abandoned.

[30] Foreign Application Priority Data

Aug. 31, 1987 [JP] Japan .................. 62-217533

[51] Int. Cl.⁵ ............................................. H04N 5/781
[52] U.S. Cl. ................... 358/342; 360/14.1; 360/15; 360/27; 360/31
[58] Field of Search ................. 358/310–311, 358/335, 342; 360/7, 14.1, 15, 27, 31

[56] References Cited

U.S. PATENT DOCUMENTS 4,496,997  1/1985  Ohtsuki ........................ 360/15 X
4,827,357  5/1989  Kawakami ..................... 360/15 X Primary Examiner—Wayne R. Young
Attorney, Agent, or Firm—Sandler, Greenblum & Bernstein

[57] ABSTRACT

A dubbing apparatus for dubbing signals in which recording information, such as a distinction between the field picture and the frame picture, the track number, the date of shooting, etc. is multiplexed with compound video signals of a still picture. Revising data is inputted for instructing the revision of recording information. A decoder decodes the recording information to be dubbed. New recording information is prepared on the basis of the revising data and the decoded recording information. An encoder encodes the new recording information, while a modulating circuit modulates the encoded recorded information. A frequency modulation circuit frequency modulates a video signal that is to be dubbed, while a synthesizing circuit multiplexes the modulated recording information and the video signal. The multiplexed signal is recorded on a recording medium, so that it is possible to revise recording information at the time of dubbing.

19 Claims, 3 Drawing Sheets

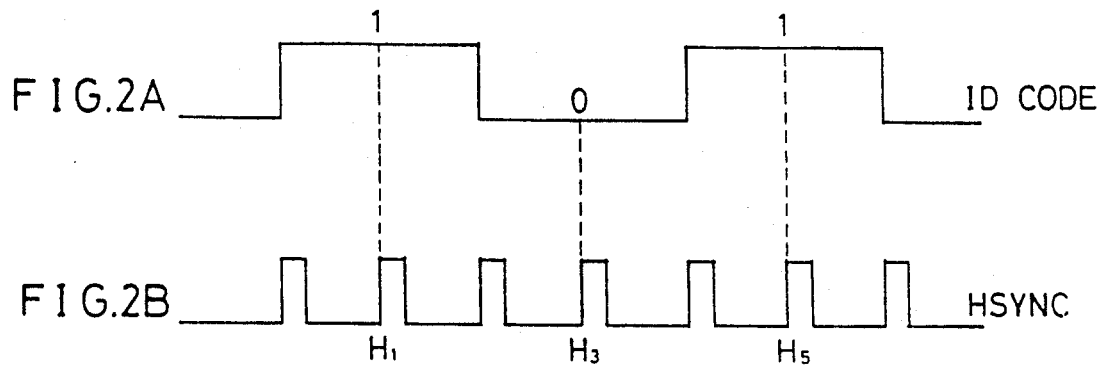
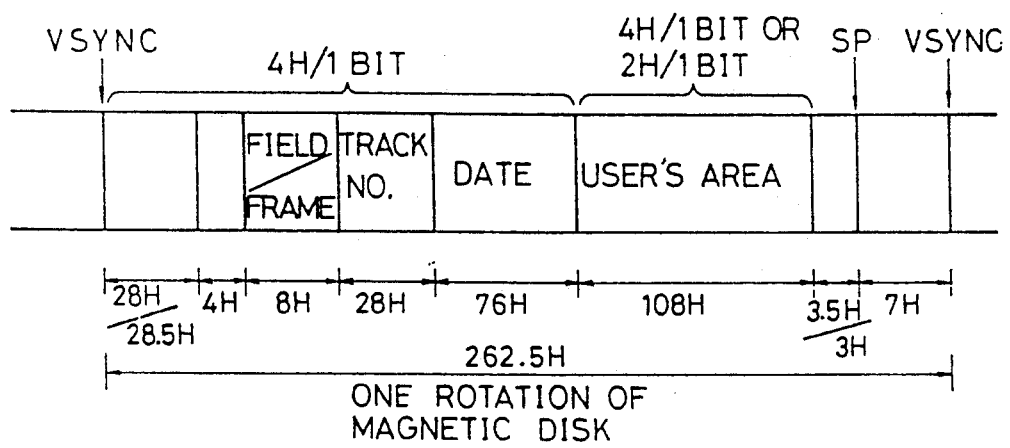
FIG. 3

APPARATUS FOR MINIMIZING SIGNAL DEGRADATION DURING THE COPYING OF VIDEO SIGNALS FROM ONE RECORDING MEDIUM TO ANOTHER RECORDING MEDIUM

This application is a continuation of application Ser. No. 07/782,726, filed Oct. 28, 1991, now abandoned, which is a continuation of application Ser. No. 07/238,420 filed on Aug. 31, 1988, now abandoned.

BACKGROUND OF THE INVENTION

1. Field of the Invention

The present invention relates to a dubbing apparatus and, more particularly, to an apparatus for dubbing signals in which recording information, such as a distinction between a picture field and a picture frame, a track number, the date of shooting, etc. is multiplexed with compound video signals of a still picture.

2. Description of the Prior Art

FIG. 4 illustrates a conventional magnetic recording and reproducing apparatus for recording and reproducing video signals of a still picture. The arrangement is such that, by connecting this apparatus to an identical apparatus, dubbing can be effected from one apparatus to the other.

Namely, if an operation switch 10, consisting of a plurality of switches, is operated to set the mode to a reproduction mode, an analog switch 14 is changed over to the PB side by means of a system controller 12. A signal recorded on a magnetic disc 16 is read by a magnetic head 18.

Concentric tracks are defined on the magnetic disk 16, and composite color video signals of one-field picture and various types of recording information multiplexed therewith are recorded on each track. These various types of information which identifies the recorded image will hereinafter be collectively referred to as ID code.

The read signal is supplied to a recording information separation circuit 22 via a reproducing amplifier 20, where it is separated into a composite color video signal and recording information. The separated recording information is fetched to an output terminal 28 via a differential phase shift keying (DPSK) demodulation circuit 26 and is further supplied to the system controller 12 via a decoder 30, and this recording information being displayed on a display 32. Meanwhile, the composite color video signal is fetched from the recording information separation circuit 22 to an output terminal 34 via a frequency demodulation circuit 24. A synchronizing signal contained in this signal is separated by a synchronizing signal separation circuit 36, and is supplied to a decoder 30 as a timing signal.

Reproduction signals fetched to the output terminals are supplied to another magnetic recording and reproducing apparatus having the same configuration as the one shown in FIG. 4, and dubbing is carried out. To describe this dubbing procedure with reference to FIG. 4, if the operation switch 10 is operated to select the recording mode and the dubbing mode, an analog switch 38 is changed over to the D side by means of the system controller 12, while the analog switch 14 is changed over to the REC side. The above-described recording information is supplied to one input terminal 40 of a synthesizing circuit 44 via an input terminal 40, the analog switch 38, and a DPSK modulation circuit 42. Meanwhile, the above-described reproduced video signal is supplied to the other input terminal of the synthesizing circuit 44 via an input terminal 46 and a frequency modulation circuit 48. In addition, a synchronizing signal contained in the video signal is supplied to the DPSK modulation circuit 42 as a timing signal. The output of the synchronization circuit 44 is supplied to the magnetic head 18 via a recording amplifier 52 and the analog switch 14, and is recorded on the magnetic disk 16.

When normal recording is to be effected, the operation switch 10 is operated, and recording information is input to the system controller 12 while it is being confirmed through the display 32. This recording information is supplied to the synthesization circuit 44 via the encoder 54, the analog switch 38, and the DPSK modulation circuit 42 with the synchronizing signal from the synchronizing signal separation circuit 36 serving as a timing signal, and is synthesized (frequency division multiplexed) with the signal in which the composite color video signal supplied from the input terminal 46 is subjected to frequency modulation. The subsequent procedure is the same as the case of the above-described dubbing.

The format (standard format) of recording information in an electronic still camera is shown in FIG. 3. In the drawing, nH denotes a n-number of horizontal synchronization pulses, and the upper side of / is the case where recording is carried out in odd-numbered fields, while the lower side of / is the case where recording is carried out in even-numbered fields. Switching point SP constitutes a reference position of the rotation of the magnetic disk 16, and is detected each time the magnetic disk 16 undergoes one rotation. The rotation of the magnetic disk 16 is controlled in such a manner that the interval between the switching point SP and a vertical synchronizing signal VSYNC becomes 7H. Recording information (ID code) includes that of a distinction between the field picture and the frame picture, a distinction between an outer track and an inner track in the case of a frame picture, the number of a track on which the picture is recorded, the date of shooting, and a user's area where the user can record information at his disposal. The recording density of recording information is one bit with respect to 4H. However, the user's area may be 2H/1 bit.

However, since the recording information is dubbed as it is together with video signals, if the track number of the magnetic disk from which dubbing is effected is different from that of the magnetic disk to which dubbing is effected, dubbing is effected on a track whose track number is different that of the recording information.

In addition, if, with respect to the frame picture constituted two fields, dubbing is effected by using only one field as the field picture, the recording information is recorded as the frame picture. Therefore, if this is reproduced, it is reproduced as the frame picture, with the result that the reproduced picture is disturbed.

Furthermore, although there are cases where it is desirable to automatically change the contents of the user's area for the purpose of controlling the dubbing quality each time dubbing is conducted, it is impossible to meet such demand.

SUMMARY OF THE INVENTION

Accordingly, it is an object of the present invention to provide a dubbing apparatus which is capable of revising recording information at the time of dubbing, as necessary, thereby overcoming the drawbacks of the conventional art.

To this end, according to the present invention, there is provided a dubbing apparatus comprising: input means for inputting revising data for instructing a revision of recording information; a decoder for decoding the recording information to be dubbed; recording information revising means for preparing new recording information on the basis of the revising data and the decoded recording information; an encoder for encoding the new recording information; a recording information modulating circuit for modulating the encoded recording information; a frequency modulation circuit for frequency modulating a video signal to be dubbed; a synthesizing circuit for multiplex modulating the recording information and the video signal; and recording means for recording the multiplexed signal on a recording medium.

In the dubbing apparatus according to the present invention, since before recording is effected, reproduced recording information is revised in accordance with that recording, the recording information is revised appropriately.

In addition, if the dubbing frequency is used as one item of recording information and is adapted to be automatically incremented each time dubbing is carried out, the quality control of dubbing can be effected in a simple operation.

BRIEF DESCRIPTION OF THE DRAWINGS

FIGS. 1 to 3 relate to one embodiment of the present invention, in which

FIG. 1 is a block diagram of essential portions of a magnetic recording and reproducing apparatus;

FIGS. 2A and 2B are waveform diagrams illustrating processing by a decoder;

FIG. 3 is a diagram illustrating a format of recording information recording in a magnetic disk.

DESCRIPTION OF THE PREFERRED EMBODIMENT

Referring now to the accompanying drawings, a description will be given of an embodiment of the present invention.

Figure 1:
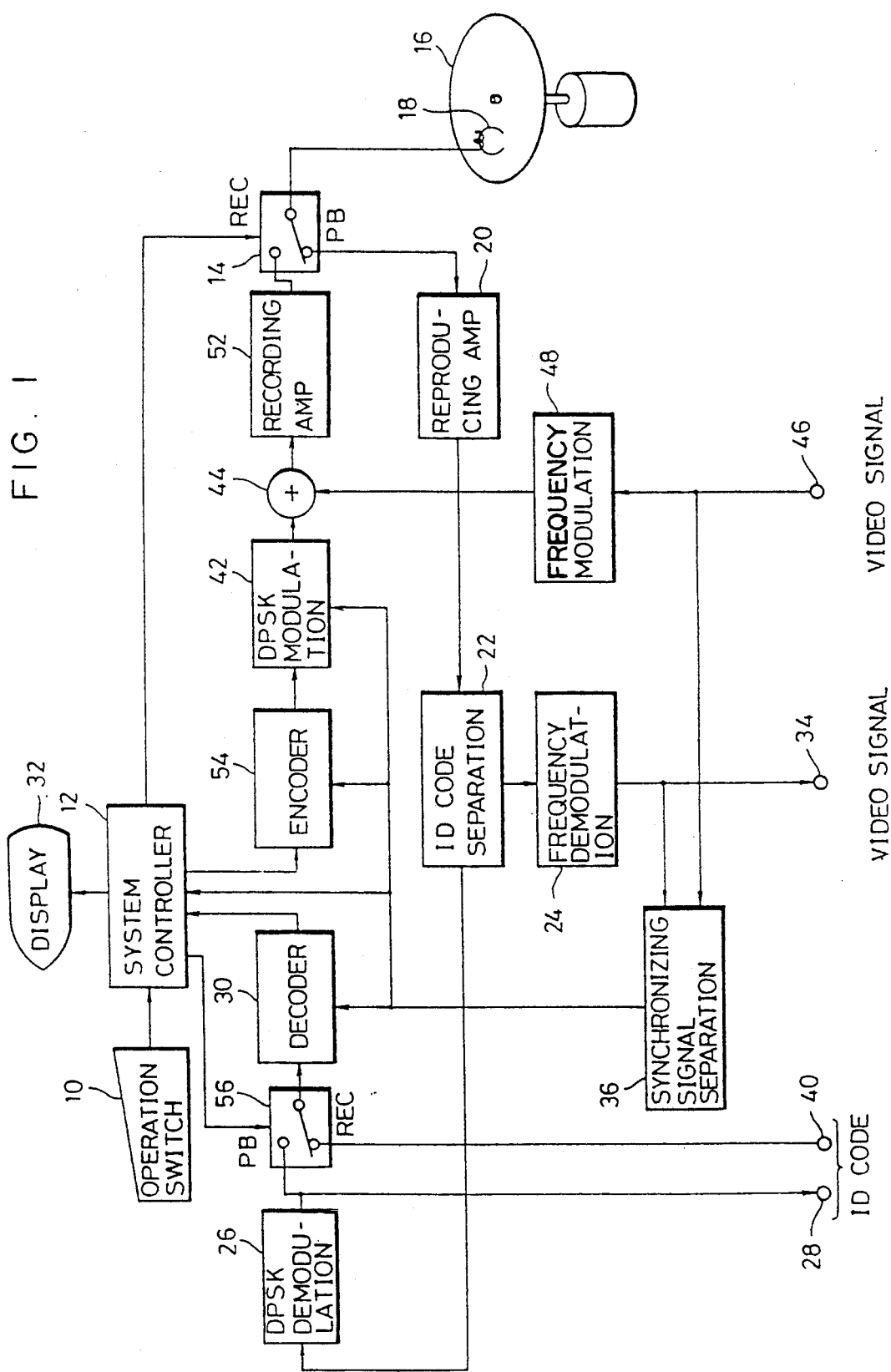
Figure 4:
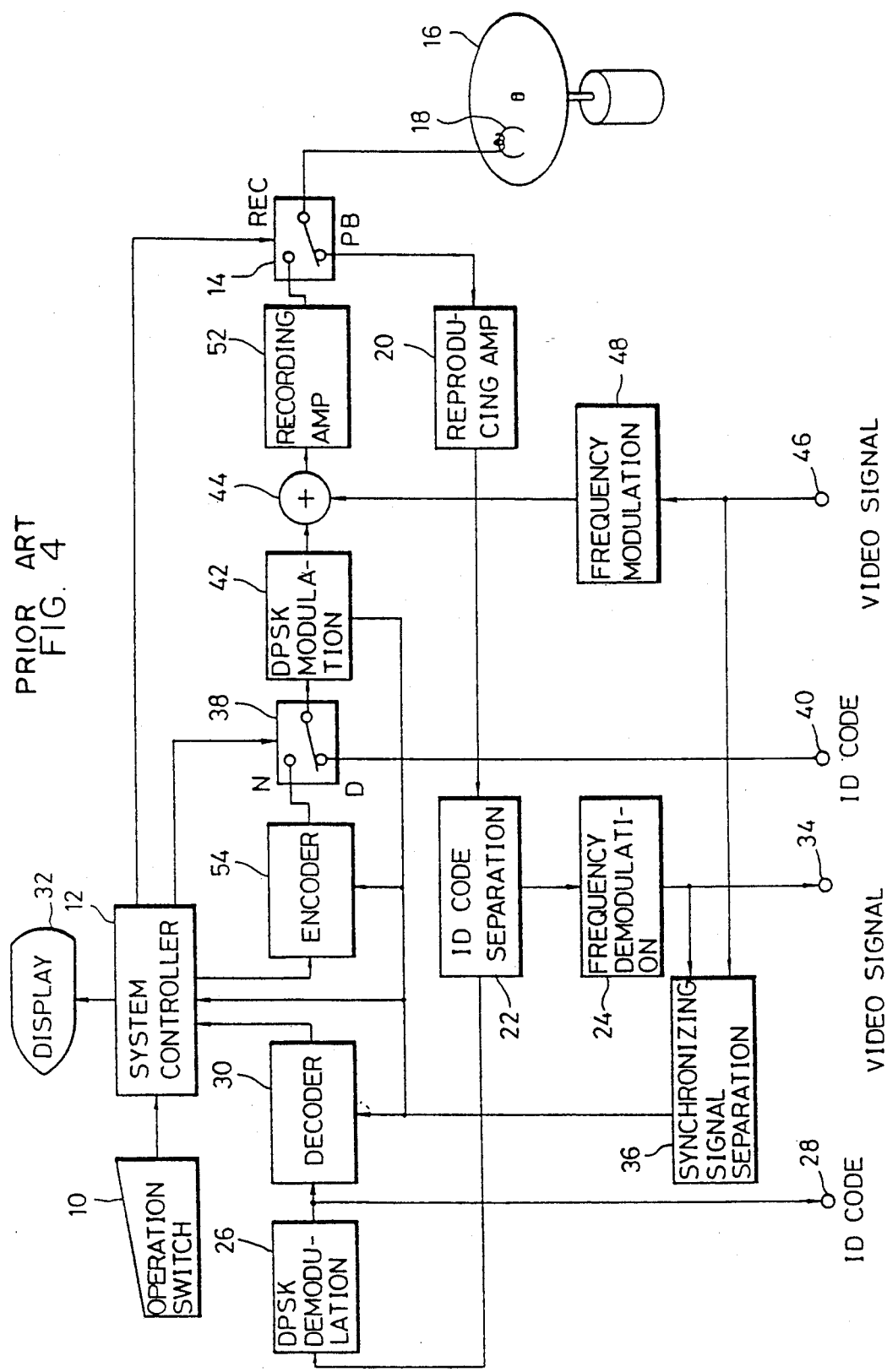
FIG. 4 is a block diagram of essential portions of a conventional magnetic recording and reproducing apparatus.

FIG. 1 is a block diagram of a magnetic recording and reproducing apparatus for recording and reproducing a still picture, those elements that have the same functions as those shown in FIG. 4 being denoted by the same reference numerals.

In FIG. 1, the magnetic recording and reproducing apparatus in accordance with the present invention comprises the following components: operation switch 10, consisting of a plurality of switches, which is used for selecting a recording mode or a reproduction mode and inputting recording information, data for revising recording information, and similar data; a system controller 12 adapted to display input data from the operation switch 10 on display 32, change over analog switches 14 and 56 to a recording (REC) side or reproduction (PB) side on the basis of the input data, and supply the recording information to an encoder 54 with a vertical synchronization signal VSYNC and horizontal synchronization signal HSYNC from a synchronization signal separation circuit 36 serving as timing signals; and a magnetic disk 16 for recording video signals with which recording information has been multiplexed, a picture for one field being recorded on each concentric track of the magnetic disk 16.

Furthermore, the magnetic recording and reproducing apparatus in accordance with the present invention further comprises a magnetic head 18 that is used for writing a signal on the magnetic disk 16 and reading a written signal; the reproducing amplifier 20; a recording information separation circuit 22 for separating recording information from a video signal; a frequency demodulation circuit 24; a DPSK demodulation circuit for subjecting the separated recording information to DPSK demodulation; a decoder 30 for decoding the demodulated recording information by using a synchronizing signal separated by a synchronizing signal separation circuit 36 as the timing signal and converting the recording information into parallel data to be supplied to the system controller 12; a DPSK modulation circuit 42; a synthesizing circuit for multiplexing the recording information from the DPSK modulation circuit 42 on the frequency modulated video signal; a frequency modulation circuit 48; and a recording amplifier 52.

Moreover, this apparatus further comprises a output terminal 28 for fetching the recording information demodulated by a DPSK demodulation circuit 26; the output terminal 34 for fetching the video signal separated by the recording information separation circuit 22 and subjected to frequency demodulation by the frequency demodulation circuit 24; and an input terminal 40 for supplying the recording information (serial signal) to the decoder 30.

It should be noted that the conversion between the serial data and parallel data may be effected by the system controller 12 instead of the decoder 30 and the encoder 42.

A description will now be given of this embodiment having the above-described arrangement.

By connecting this magnetic recording and reproducing apparatus to another magnetic recording and reproducing apparatus having the same arrangement, it is possible to effect dubbing from one apparatus to the other.

In other words, if the operation switch 10 is operated to select the reproduction mode, and if the track to be reproduced is designated, the system controller 12 displays these items of information on the display 32, rotates the magnetic disk 16, moves the magnetic head 18 to the targeted track position, and changes over the analog switches 14, 56 to the PB side at an appropriate time. Consequently, the video signal and recording information recorded on a relevant track of the magnetic disk 16 is read by the magnetic head 18, is supplied via the analog switch 14 to the reproducing amplifier 20 where it is amplified, and is separated into the video signal and recording information by the recording information separation circuit 22. The recording information is supplied to the DPSK demodulation circuit 26 so as to be subjected to DPSK demodulation, and the recording information is fetched to the output terminal 28 in the form of a serial signal (rectangular wave), such as the one shown in FIG. 2A.

In addition, the recording information is supplied, via the analog switch 56, to the decoder 30 where a determination is made as to whether the content of the recording information is 1 or 0. Subsequently, this information is decoded according to the DPSK rule (1 if the bit data is an inversion of the immediately preceding bit data, or 0 if it is the same as the immediately preceding bit data). This decoded serial data is converted into parallel data and supplied to the system controller 12, this recording information being displayed on the display 32.

Meanwhile, the video signal separated by the recording information separation circuit 22 and subjected to frequency modulation by the frequency modulation circuit 24 is fetched to the output terminal 34. In addition, the vertical synchronization signal VSYNC and the horizontal synchronization signal HSYNC, which are contained therein, are separated by the synchronizing signal separation circuit 36, and are supplied to the decoder 30 as timing signals. In the case of the user's area in which a recording has been made with 2H/1 bit, the decoder 30 determines whether the serial signal (rectangular waves) is 1 or 0 with the front edges of $H_1$, $H_3$, $H_5$, ... of which are odd-numbered HSYNC signals with VSYNC serving as a reference, as shown in FIGS. 2A and 2B, and performs decoding according to the DPSK rule.

The recording information and video signal which are respectively fetched to the output terminals 28, 34 of this magnetic recording and reproducing apparatus (the apparatus from which dubbing is carried out) is supplied to the other magnetic recording and reproducing apparatus (the apparatus to which dubbing is carried out).

To give a description with reference to FIG. 1, the reproduced recording information and video signal are respectively supplied to the input terminals 40, 46. In this apparatus to which dubbing is carried out, the operation switch 10 has been operated to set the mode to the recording mode, and has also been operated to supply the revising data for revising the reproduced recording information appropriately to the system controller 12.

This revising data is input, for instance, in the following form:

TRACK1/10

This is an instruction to record signals on track No. 1 and thereafter of the apparatus from which dubbing is effected, consecutively in correspondence with track No. 10 and thereafter, and to revise the track number shown in FIG. 3 accordingly.

In addition, if

COPY10 is inputted, it is an instruction to write 10 in the user's area shown in FIG. 3 as the frequency of dubbing (this writing can also be revised). It is also an instruction to automatically increment, i.e., revise, the frequency of dubbing and write it in the user's area each time dubbing is carried out by replacing the the magnetic disk 16 of the apparatus to which dubbing is effected.

This frequency of dubbing is utilized in the quality control and the like of dubbing. For instance, if a disk for which dubbing has been carried out for the 1,000th time is subjected to sampling inspection, and if a faulty picture has been recorded for some cause or other, it can be estimated that a similar faulty picture will be written in subsequently dubbed ones.

Furthermore, if

FIELD20 is inputted, it is an instruction to record the picture as the field picture with respect to track No. 20 and thereafter regardless of whether or not the picture of the apparatus form which dubbing is effected is a frame picture, and to revise the distinction between the field picture and the frame picture to the field picture.

The system controller 12 displays such revising data on the display 32, and changes over the analog switches 14, 56 to the REC side at an appropriate time. Accordingly, the recording information is supplied to the decoder 30 via the analog switch 56. The decoder 30 decodes the recording information int he same way as the above-described case of reproduction by using the vertical synchronizing signal VSYNC and the horizontal synchronizing signal HSYNC supplied form the synchronizing signal separation circuit 36 as timing signals, converts the same into parallel signals and supplies it to the system controller 12. The system controller 12 revises the recording data, as required, on the basis of the above-mentioned revising data, and supplies the revised recording data to the encoder 54 by using the synchronizing signal from the synchronizing signal separation circuit 36 as a timing signal. The encoder 54, in turn, performs the opposite processing to that of the decoder 30 and supplies this processed signal to the DPSK modulation circuit 42.

The recording information subjected to DPSK modulation is supplied to one input terminal of the synthesizing circuit 44. Meanwhile, the video signal is supplied to the frequency demodulation circuit 48 via the input terminal 46 so as to be subjected to frequency modulation, and is supplied to the other input terminal of the synthesizing circuit 44. The DPSK modulated recording information is multiplexed with the frequency modulated video signal (e.g., frequency division multiplexed), is then amplified by the recording amplifier 52, and is written on a predetermined track of the magnetic disk 16 via the analog switch 14 and the magnetic head 18. The analog switch 14 is changed over to the REC side with respect to dubbing of one track for the period of one vertical scanning (one rotation of the magnetic disk 16) for which this multiplexing is carried out.

Thus, the appropriately revised recording information is dubbed together with the video signal.

When normal recording is carried out (that is, dubbing is not being performed), the recording information is inputted to the system controller 12 by operating the operation switch 10, and the video signal is applied to the input terminal 46. This recording information is supplied to the encoder 54 with the synchronizing signal separated by the synchronizing signal separation circuit 36 serving as a timing signal.

Although, in the above-described embodiment, a description has been given of a case where the recording medium comprises a magnetic disk, the present invention is not restricted to the same, and the recording medium may be one which is electrically or optically recorded and reproduced.

In addition, although, in the above-described embodiment, a description has been given of a case where recording information is multiplexed with a video signal, the present invention suffices if the recording information is added to the video signal, and they may be recorded separately at different positions.

With respect to the revision of the track number, the operator need not give an instruction, and an arrangement may be alternatively provided to automatically effect the revision.

Furthermore, an arrangement may be provided such that, a control signal is output from the system controller 12 on the basis of revising data, the output level of a serial data outputted from the decoder 30 being inverted on a real-time basis, as necessary, and being supplied to the encoder 54.

In the above-described embodiment, a description has been given of a case where the video signal is supplied to the encoder 54 and the DPSK modulation circuit 42 with a synchronizing signal from the synchronizing signal separation circuit 36 serving as a timing signal. However, it is possible to provide an arrangement in which, on the basis of this synchronizing signal, the timing signal is supplied from the system controller 12 to the encoder 54 and the DPSK modulation circuit 42, so that the front edge of the horizontal synchronizing signal contained in the signal supplied from the input terminal 46 is accurately aligned with a point of shift in the phase of a signal outputted from the DPSK modulation circuit 42.

What is claimed is:

1. A dubbing apparatus, comprising:
   means for selectively inputting revising data for instructing a revision of recording information;
   means for inputting said recording information and a demodulated recording signal to a switch which selectively outputs either said demodulated recording signal or the inputted recording information;
   a decoder that decodes the output of said switch;
   means for revising said recording information that is outputted from said decoder when said switch outputs the inputted recording information;
   an encoder for encoding said recording information that has been revised by said revising means;
   a recording information modulating circuit for modulating the encoded recording information;
   a frequency modulation circuit for frequency modulating a composite video signal to be dubbed;
   a synthesizing circuit for multiplex modulating the modulated encoded recording information and the frequency modulated composite video signal to form a multiplexed signal; and
   means for recording said multiplexed signal onto a recording medium.

2. A dubbing apparatus according to claim 1, further comprising a synchronizing signal separation circuit for separating a vertical synchronizing signal and a horizontal synchronizing signal from said composite video signal, said decoder and said encoder performing the decoding and said encoding on the basis of the separated synchronizing signals.

3. A dubbing apparatus according to claim 2, wherein said recording information modulating circuit subjects the encoded recording information to differential phase shift keying modulation.

4. A dubbing apparatus according to claim 3, wherein the multiplexing by said synthesizing circuit comprises frequency division multiplexing.

5. A dubbing apparatus according to claim 4, further comprising a display for displaying said revising data and the decoded recording information.

6. A dubbing apparatus according to claim 5, wherein said recording medium comprises a magnetic disk, and a video signal contained in said composite video signal comprises a video signal of a still picture.

7. A dubbing apparatus according to claim 6, wherein said recording information revising means revises a track number on the basis of said revising data when said revising data concerns a track number of said magnetic disk, regardless of the value of a track number which is part of the decoded recording information, thereby preparing the revised recording information.

8. A dubbing apparatus according to claim 6, wherein said recording information revising means increments the frequency of dubbing which is part of the decoded recording information, thereby preparing the revised recording information.

9. A dubbing apparatus according to claim 5, wherein said inputting means comprises an operation switch having a plurality of switches.

10. A dubbing apparatus according to claim 5, further comprising a reproducing circuit, having:
    means for reading a signal from said recording medium in which the signal with said recording signal and said composite video signal multiplexed therein has been recorded;
    means for separating the read signal into said recording signal and said composite video signal;
    means for subjecting the separated recording signal to differential phase shift keying demodulation; and
    means for subjecting the separated composite video signal to frequency demodulation.

11. The dubbing apparatus of claim 1, further comprising a display that displays the decoded output of said decoder when said switch outputs said demodulated recording signal.

12. The dubbing apparatus of claim 11, wherein said display further displays said revising data when said switch outputs the inputted recording information.

13. The dubbing apparatus of claim 1, further comprising a display that displays said revising data when said switch outputs the inputted recording information.

14. The dubbing apparatus of claim 1, further comprising a display that displays revising data when said switch outputs the inputted recording information.

15. A dubbing apparatus, comprising:
    means for separating an ID code from a video signal retrieved from a recordable medium, the separated video signal being frequency demodulated into a composite video signal;
    means for outputting said composite video signal while simultaneously separating a synchronizing signal therefrom, the separated synchronizing signal being inputted to a decoder;
    a differential phase shift keying demodulator for demodulating said ID code separated by said separating means;
    means for outputting the demodulated ID code to an output terminal;
    means for inputting recording information and the outputted demodulated ID code to a switch which selectively forwards either the demodulated ID code or the inputted recording information to said decoder, an output of said decoder being inputted to a system controller that functions to revise said recording information when said recording information is outputted by said decoder;
    means for inputting a composite video signal to a frequency modulator while simultaneously separating a synchronizing signal therefrom;
    means for encoding the revised recording information from said system controller;
    means for differential phase shift key modulating a signal outputted from said encoding means;
    means for synthesizing a signal from said differential phase shift key modulating means and a frequency modulated signal that is outputted from said composite video signal inputting means; and
    means for storing the synthesized signal in said recordable medium.

16. The dubbing apparatus of claim 15, further comprising a display that displays said output of said decoder when said switch outputs the demodulated ID code.

17. The dubbing apparatus of claim 16, wherein said display further displays revising data when said switch outputs the inputted recording information.

18. A dubbing apparatus, comprising:
    an operation switch for selectively inputting revising data;
    a switch that receives inputted recording information and a demodulated recording signal, said switch selectively outputting either said demodulated recording signal or said inputted recording information;
    a decoder that decodes said output of the switch;
    a system controller that revises said inputted recording information outputted from said decoder when said switch outputs said inputted recording information;
    a display that displays said demodulated recording signal when said switch outputs said demodulated recording signal, and which displays said revising data when said switch outputs said inputted recording information;
    an encoder for encoding said inputted recording information that has been revised by said system controller;
    a recording information modulating circuit for modulating the encoded recording information;
    a frequency modulation circuit for frequency modulating a composite video signal to be dubbed;
    a synthesizing circuit for multiplex modulating the modulated encoded recording information and the frequency modulated composite video signal to form a multiplexed signal; and
    a recorder that records said multiplexed signal onto a recording medium.

19. The dubbing apparatus of claim 18, wherein said recorder comprises a magnetic recorder and said recording medium comprises a magnetic disk.

* * * * *